United States Patent Office 3,484,479
Patented Dec. 16, 1969

3,484,479
UNSATURATED SULPHONIC ACID BETAINES
AND A PROCESS FOR THEIR PRODUCTION
Heinrich Rinkler and Gunther Nischk, Dormagen, Germany, assignors to Farbenfabriken Bayer Aktiengesellschaft, Leverkusen, Germany, a corporation of Germany
No Drawing. Filed Sept. 1, 1966, Ser. No. 576,557
Claims priority, application Germany, Sept. 9, 1965,
F 47,136
Int. Cl. C07c 143/84
U.S. Cl. 260—501.12                                       4 Claims

ABSTRACT OF THE DISCLOSURE

Unsaturated sulphonic acid betaine of the formula:

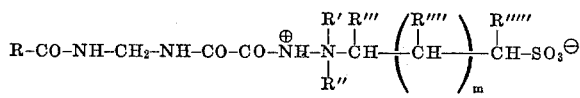

wherein R represents an alkenyl or aralkenyl radical, R′ and R″ represents the same or different alkyl radicals with 1–4 carbon atoms, R‴, R⁗ and R⁗′ are hydrogen or a lower alkyl radical and m is an integer from 1–2, which is adapted for use as an antistatic agent particularly for high molecular weight polymers.

DISCLOSURE

The invention relates to unsaturated sulphonic acid betaines and to a process for the production of unsaturated sulphonic acid betaines by the reaction of unsaturated N,N-disubstituted acid hydrazides with sultones.

It is known to react aliphatic sultones with compounds which have a mobile hydrogen atom. In such a case, the corresponding ω-sulphonic acids are formed; thus, for example, when reacting sultones with carbonamide groups, the corresponding imino esters or N-substitution products with terminal sulphonic acid groups are formed, depending on the reaction conditions. It is also known that tertiary amines can be alkylated on the nitrogen atom with sultones.

It has now been found that new unsaturated sulphonic acid betaines are obtained if unsaturated N,N-disubstituted acid hydrazides of the general formula:

$$R-CO-NH-CH_2-NH-CO-CO-NH-N\diagdown_{R''}^{R'} \quad (A)$$

wherein R represents an alkenyl or aralkenyl radical and R′ and R″ represent the same or different alkyl radicals, are reacted with aliphatic sultones of the formula:

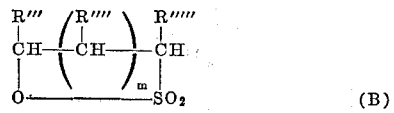

wherein R‴, R⁗ and R⁗′ represents hydrogen or a lower alkyl radical and m is an integer from 1–2, at temperatures from 0–150° C., if desired in an organic solvent and with addition of polymerisation inhibitors.

As unsaturated N,N-disubstituted acid hydrazides, the following compounds can for example be used:

methacrylamidomethylene - N - oxamido - N′,N′ - dimethylhydrazide,
crotonylamidomethylene - N - oxamido - N′,N′ - dimethylhydrazide,
cinnamylamidomethylene - N - oxamido - N′,N′ - dimethylhydrazide and
methacrylamidomethylene - N - oxamido - N′,N′ - diethylhydrazide.

The unsaturated sulphonic acid betaine which is obtained according to the reaction, corresponds to the formula:

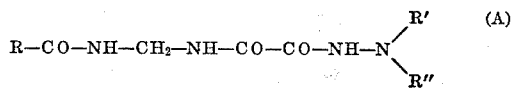

in which R represents an alkenyl radical or aralkenyl radical, R′ and R″ represents the same or different alkyl radical, R‴, R⁗ and R⁗′ represents hydrogen or a lower alkyl radical and m is an integer from 1–2.

Preferred alkyl radicals are those with 1 to 4 carbon atoms.

The unsaturated N,N-disubstituted acid hydrazides can for example be prepared in the following manner:

The known oxalic acid ester amides are condensed with unsaturated carboxylic acid methylolamides or their alkyl ethers to form alkenylamido or aralkenylamido methylene oxamide esters. These condensation products can then be reacted in the nest phase at room temperature or slightly raised temperature with N,N-disubstituted hydrazines to the corresponding N,N-disubstituted oxalic acid hydrazides. It is surprising that in this procedure there is no addition of the hydrazines to the double bond of the α,β-unsaturated carboxylates. The unsaturated methylene oxamidodialkylhydrazides obtained in this way are then reacted preferably in organic solvents with aliphatic sultones, as for example propane-1,3-sultone and butane-1,4-sultone, preferably at elevated temperature. The alkylation products are obtained in crystalline form and can be separated out by simple filtration with suction. Preferred solvents are those in which the starting products are soluble. Such solvents include in particular organic solvents such as aliphatic nitriles, for example acetonitrile or propionitrile, or N,N-disubstituted formamides, for example dimethylformamide.

The process according to the invention is carried out at room temperature or at an elevated temperature of up to 150° C., advantageously between 40 and 100° C. Tertiary butyl pyrocatechol or phenthiazine can, for example, be used as polymerisation inhibitors.

It was surprising to find that the products according to the invention would be prepared as homogeneous compounds, since the starting compounds contain four nitrogen atoms, which could have reacted with sultones. It was therefore to be expected that all these nitrogen atoms would react with the sultone, thus resulting in completely indefinite products. In contrast thereto, only the N,N-disubstituted nitrogen atom of the hydrazide group is quaternised to form a homogeneous compound in yields up to 90%.

The new compounds are suitable as antistatic agents. It is possible by means of these compounds substantially to improve the antistatic properties of high molecular weight polymers, such as polyvinylchloride, polyethylene, polypropylene and polyamide by incorporation of these compounds (by rolling) in quantities of 0.1 to 5% by weight, based on the weight of the high molecular weight polymers. The following examples illustrate more specifically the invention. All parts given in these examples are parts by weight.

Example 1

117 parts of oxalic acid ethylester amide and 129 parts of methacrylamide-N-methylolmethylether (or 115 parts of N-methylolmethacrylamide) are heated in the presence of 1 part of phenthiazine and of 1 part of p-toluolsulfonic acid for 2–3 hours at 120–130° C. 27–32 parts of methanol (and 16–18 parts of water) distil off in this procedure. The residue, which is methacrylamidomethylene-N-oxamidoethylester, which has the formula

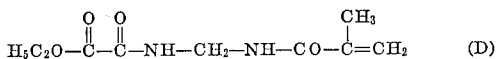

crystallises on cooling and can be recrystallised from ethanol. Yield: 190 parts, M.P. 78–80° C.

214 parts of methacrylamidomethylene-N-oxamidoethylester are dissolved in 800 parts of ethanol. 65 parts of N,N-dimethylhydrazine are added dropwise at room temperature. Stirring is continued for another 8–10 hours at room temperature and the precipitate, which is methacrylamidomethylene - N - oxamido-N',N'-dimethylhydrazide, has the formula:

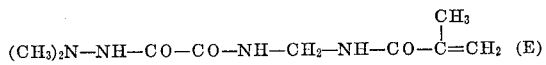

Yield: 185 parts, M.P. 223° C.

228 parts of methacrylamidomethylene-N-oxamido-N',N'-dimethylhydrazide and 135 parts of propane-1,3-sultone are stirred into 1200–1400 parts of acetonitrile and in the presence of 1–2 parts of phenthiazine for 8–10 hours at 40° C. Heating is then carried on for another 18–24 hours at 75–80° C. The quaternised methacrylamidomethylene - N - oxamido - N',N' - dimethylhydrazide, of the formula:

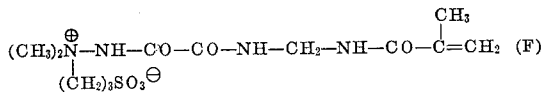

is obtained in crystalline form and can be filtered off. Yield: 328 parts, decomposition point 205–210° C.

Example 2

117 parts of oxalic acid ethyl ester amide and 110 parts of formalin solution (30%) are heated for 1 hour at 60° C. The water is then completely extracted in vacuo. 85 parts of crotonamide and 2–4 parts of p-toluosulphonic acid are introduced into the melt and the mixture is heated for 2–3 hours at 120–130° C. 16–18 parts of water distil over. The melt which remains crystallises on cooling and can be recrystallised from ethanol. It has the formula:

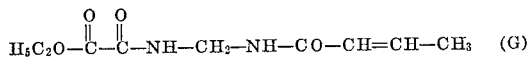

Yield: 169 parts, M.P. 95° C.

214 parts of crotonylamidomethylene-N-oxamidoethyl ester are dissolved in 800 parts of ethanol and 65 parts of N,N-dimethylhydrazine are slowly added at room temperature. Stirring is continued for another 8–10 hours at 30–50° C. The precipitate, which is crotonylamidomethylene - N - oxamido-N',N'-dimethylhydrazide of the formula:

(CH₃)₂N—NH—CO—CO—NH—CH₂
—NH—CO—CH=CH—CH₃ (H)

is filtered off with suction. Yield: 170 parts, M.P. 189° C.

228 parts of crotonylamidomethylene-N-oxamido-N',N'-dimethylhydrazide and 135 parts of propane-1,3-sultone are stirred into 1200–1400 parts of acetonitrile in the presence of 1–2 parts of phenthiazine for 8–10 hours at 40° C. The mixture is then heated for another 18–24 hours at 75–80° C. The quaternised crotonylamidomethylene-N-oxamido-N',N'-dimethylhydrazide of the formula:

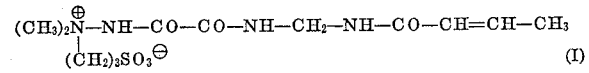

is obtained in crystalline form and can be filtered off. Yield: 260 parts, decomposition point 180–185° C.

Example 3

117 parts of oxalic acid ethylesteramide and 110 parts of formalin solution (30%) are heated for 1 hour at 60° C. The water is then completely extracted in vacuo. 147 parts of cinnamic acid amide and 4 parts of p-toluosulphonic acid are introduced into the melt and the mixture is heated for 2–3 hours at 120–130° C. 16–18 parts of water distil over and the melt becomes increasingly more solid. On cooling, it solidifies in crystalline form. Recrystallisation from dimethylformamide takes place. The product has the formula:

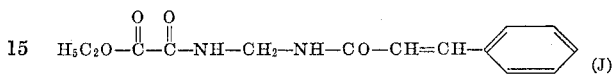

Yield: 202 parts, M.P. 157° C.

138 parts of cinnamylamidomethylene-N-oxamido ethyl ester are introduced into 500 parts of dimethylformamide and 32.5 parts of N,N-dimethylhydrazine are added dropwise at room temperature. Stirring is then carried out for another 4–5 hours at 40–60° C. and the precipitate, cinnamylamidomethylene-N-oxamido-N',N'-dimethylhydrazide, of the formula:

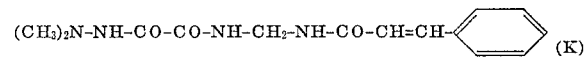

is filtered off with suction. Yield: 116 parts, M.P. 238° C.

145 parts of cinnamylamidomethylene-N-oxamido-N',N'-dimethylhydrazide and 67 parts of propane-1,3-sultone are stirred for 8–10 hours at 40° C. into 500–600 parts of acetonitrile in the presence of 1–2 parts of phenthiazine. Heating is then carried out for another 18–24 hours at 75–80° C. The quaternised cinnamylamidomethylene-N-oxamido-N',N'-dimethylhydrazide of the formula:

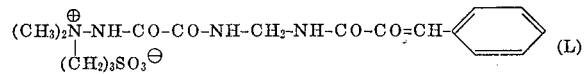

precipitates and can be filtered off. Yield: 185 parts, decomposition point 210–215° C.

What we claim is:

1. An unsaturated sulphonic acid betaine of the formula:

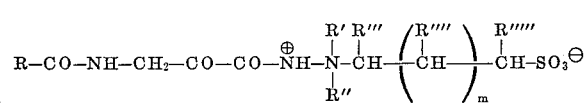

wherein R represents propenyl, isopropenyl or styryl, R' and R'' represent the same or different lower alkyl radicals, R''', R'''', and R''''' are hydrogen or a lower alkyl radical and m is an integer from 1 to 2 wherein lower alkyl means from 1–4 carbon atoms.

2. The unsaturated sulfonic acid betaine of the formula

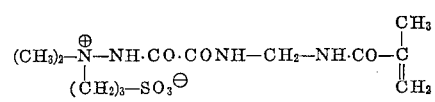

3. The unsaturated sulfonic acid betaine of the formula

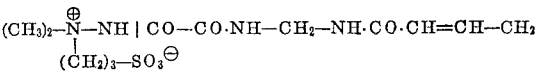

4. The unsaturated sulfonic acid betaine of the formula
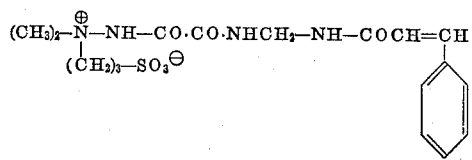
References Cited
FOREIGN PATENTS
1,424,802  12/1965  France.
OTHER REFERENCES
Netherlands Application, Chemical Abstracts, vol. 64, col. 9637, March 1966.
LEON ZITVER, Primary Examiner
M. W. GLYNN, Assistant Examiner
U.S. Cl. X.R.
260—78, 92.8, 93.7, 94.9, 471, 482, 558, 561